United States Patent [19]
Micali

[11] Patent Number: 6,097,811
[45] Date of Patent: *Aug. 1, 2000

[54] TREE-BASED CERTIFICATE REVOCATION SYSTEM

[76] Inventor: Silvio Micali, 459 Chestnut Hill Ave., Brookline, Mass. 02146

[*] Notice: This patent issued on a continued prosecution application filed under 37 CFR 1.53(d), and is subject to the twenty year patent term provisions of 35 U.S.C. 154(a)(2).

[21] Appl. No.: 08/729,619

[22] Filed: Oct. 11, 1996

Related U.S. Application Data

[60] Provisional application No. 60/006,143, Nov. 2, 1995.

[51] Int. Cl.$^7$ .................................. A04K 1/00; H04L 9/00
[52] U.S. Cl. .................................................. 380/23; 380/25
[58] Field of Search ............................................ 380/23, 25

[56] References Cited

U.S. PATENT DOCUMENTS

| | | |
|---|---|---|
| Re. 34,954 | 5/1995 | Haber et al. . |
| 4,200,770 | 4/1980 | Hellman et al. ........................ 178/22 |
| 4,218,582 | 8/1980 | Hellman et al. ........................ 178/22 |
| 4,309,569 | 1/1982 | Merkle .................................. 380/25 |
| 4,326,098 | 4/1982 | Bouricius et al. ................. 178/22.08 |
| 4,881,264 | 11/1989 | Merkle .................................. 380/25 |
| 4,926,480 | 5/1990 | Chaum .................................. 380/23 |
| 4,943,707 | 7/1990 | Boggan . |
| 5,003,597 | 3/1991 | Merkle .................................. 380/37 |
| 5,016,274 | 5/1991 | Micali et al. .......................... 380/23 |
| 5,136,646 | 8/1992 | Haber et al. . |
| 5,136,647 | 8/1992 | Haber et al. . |
| 5,157,726 | 10/1992 | Merkle et al. ......................... 380/23 |
| 5,231,666 | 7/1993 | Matyas .................................. 380/25 |
| 5,261,002 | 11/1993 | Perlman et al. ....................... 380/30 |
| 5,315,657 | 5/1994 | Abadi et al. .......................... 380/25 |
| 5,340,969 | 8/1994 | Cox . |
| 5,396,624 | 3/1995 | Campbell, Jr. . |
| 5,420,927 | 5/1995 | Micali .................................. 380/23 |
| 5,432,852 | 7/1995 | Leighton et al. ...................... 380/30 |
| 5,434,919 | 7/1995 | Chaum .................................. 380/30 |
| 5,450,493 | 9/1995 | Maher ................................... 380/30 |
| 5,497,422 | 3/1996 | Tysen et al. ........................... 380/25 |
| 5,537,475 | 7/1996 | Micali .................................. 380/30 |
| 5,544,322 | 8/1996 | Cheng et al. ..................... 395/200.12 |
| 5,551,027 | 8/1996 | Choy et al. ........................... 395/600 |
| 5,604,804 | 2/1997 | Micali .................................. 380/25 |
| 5,606,617 | 2/1997 | Brands et al. ......................... 380/30 |
| 5,610,982 | 3/1997 | Micali .................................. 380/25 |
| 5,615,268 | 3/1997 | Bisbee et al. ......................... 380/25 |
| 5,659,616 | 8/1997 | Sudia ................................... 380/23 |
| 5,677,955 | 10/1997 | Doggett ................................ 380/24 |
| 5,687,235 | 11/1997 | Perlman ................................ 380/25 |
| 5,699,431 | 12/1997 | Van Oorschot ........................ 380/30 |
| 5,717,757 | 2/1998 | Micali . |
| 5,717,758 | 2/1998 | Micali . |
| 5,748,738 | 5/1998 | Bisbee et al. ......................... 380/25 |
| 5,774,552 | 6/1998 | Grimmer . |
| 5,826,262 | 10/1998 | Bui et al. ............................... 707/7 |

OTHER PUBLICATIONS

The American Heritage Dictionary, Third Edition, pp. 125 & 314, 1992.

Applied Crypotography by Bruce Schneier, 2nd edition, pp. 573–577, Oct. 1995.

A Dictionary of Modern Legal Usage, 2nd Ed. Bryan Garner p. 930.

Meneges et al, "Handbook of Applied Cryptography"© 1997, pp. 566, 576, 577, 588, 589, 706, 716, 720, 728, 729, 737, and 751.

(List continued on next page.)

*Primary Examiner*—Gail O. Hayes
*Assistant Examiner*—Hrayr A. Sayadian
*Attorney, Agent, or Firm*—Foley, Hoag & Eliot LLP

[57] ABSTRACT

A method and system for overcoming the problems associated with certificate revocation lists (CRL's), for example, in a public key infrastructure. The invention uses a tree-based scheme to replace the CRL.

44 Claims, 2 Drawing Sheets

OTHER PUBLICATIONS

"Final Text of Draft Amendments DAM 4 to ISO/IEC 9594–2, DAM 2 to ISO/IEC 9594–6, DAM 1 to ISO/IEC 9594–7, and DAM 1 to ISO/IEC 9594–8 on Certificate Extensions", 41 pages, (Jun. 30, 1996).

ANSI X9.55–1955 "Public Key Cryptography for the Financial Services Industry: Extensions to Public Key Certificates and Certificate Revocation Lists" (working draft) 37 pages (Jul. 3, 1996).

ANSI X9.57–199x Public Key: Cryptography for the Financial Services Industry: Certificate Management© (working draft) 86 pages (Jun. 21, 1996).

Bellare, M., et al., "Incremental Cryptography: The Case of Hashing and Signing" *Proceedings of Crypto '95* 216–233 (1995).

Micali, S., "Computationally–Sound Proofs", *MIT Laboratory for Computer Science*, 55 pages, Apr. 11, 1995.

Micali, S. et al., Abstract entitled "An Efficient Zero–Knowledge Method for Answering Is He In Or Out? Questions" presented by M. Rabin at the National Computer Science Institute In Berkeley, CA (Dec. 1995).

Escrowed Encryption Standard (EES) FIPS Pub. 185, Feb. 9, 1994.

Farrell, S., et al., "Internet Public Key Infrastructure Part III: Certificate Management Protocols," Published on the World Wide Web 83 printed pages, Dec., 1996.

CygnaCom Solutions, Inc., "Federal Public Key Infrastructure (PKI) Technical Specifications Part D—Interoperability Profiles," Published on the World Wide Web, Sep. 27, 1995, 91 pages.

Nazario, N., "Federal Public Key Infrastructure (PKI) Version 1 Technical Specifications: Part B—Technical Security Policy,"Published on the World Wide Web, Mar. 13, 1996, 20 pages.

Polk, W., editor, "Federal Public Key Infrastructure (PKI) Technical Specifications (Version 1) Part A: Requirements," Published on the World Wide Web, Dec. 6, 1996, 18 pages.

Ford, Warwick, "A Public Key Infrastructure for U.S. Government Unclassified but Sensitive Operations," Published on the World Wide Web, Sep. 1, 1995, 93 pages.

Chokhani, Santosh, et al., "Certificate Policy and Certification Practice Statement Framework", Published on the World Wide Web, Nov. 3, 1996.

Burr, William E. et al., "A Proposed Federal PKI Using X.509 V3 Certificates," Published on the World Wide Web.

Burr, W.E., "Public Key Infrastructure (PKI) Technical Specifications (Version 1): Part C—Concept of Operations," Published on the World Wide Web, Feb. 12, 1996, 30 pages.

Ford, Warwick, "Public–Key Infrastructure Standards," Published on the World Wide Web, Oct. 1996, 15 printed pages.

Polk, William T., "Minimum Interoperability Specifications for PKI Components," Published on the World Wide Web, Nov., 199.

Chokhani, Santosh, "Security Considerations in Using X. 509 Certificates," Published on the World Wide Web.

Dodson, Donna F., "NIST PKI Implementation Projects," Published on the World Wide Web.

Ford, Warwick, "Public–Key Infrastructure Standards," Published on the World Wide Web.

Burr, William, "A Proposed Federal PKI Using X. 509 V3 Certificates: The NISSC Presentation," Published on the World Wide Web.

Nazario, Noel et al., "Management Model for the Federal Public Key Infrastructure," Published on the World Wide Web, Oct. 24, 1996.

Nazario, Noel A., "Security Policies for the Federal Public Key Infrastructure," Published on the World Wide Web, Oct. 24, 1996.

Burr, William, et al., "MISPC: Minimum Interoperability Specifications for PKI Components," Published on the World Wide Web, Dec. 2, 1996.

Escrowed Encryption Standard (EES) FIPS Pub. 185, Feb. 9, 1994.

Chaum, D., "Untraceable Electronic Mail, Return Addresses, and Digital Pseudonyms," *Communications of the ACM*, vol. 24, No. 2, Feb. 1981, pp. 84–88.

Gennaro, Rosario et al., "Robust Threshold DSS Signatures," Abstract from *EuroCrypt '96*.

Harn, L., "Group Oriented (t,n) threshold digital signature scheme and digital multisignature," *IEE Proc.—Comput. Digit. Tech.*, vol. 141, No. 5, Sep. 1994, pp. 307–313.

Micali, Silvio, "Enhanced Certificate Revocation System," Technical Report, Nov. 1995.

Rivest, Ronald et al., "SDSI—A Simple Distributed Security Infrastructure," Sep. 15, 1996, Published on the World Wide Web.

Rivest, R.L., et al., "A Method for Obtaining Digital Signatures and Public–Key Cryptosystems", *Communications of the ACM*, 120–126 (Feb. 1978).

Lamport, L., "Password Authentication with Insecure Communication", *Communications of the ACM*, 770–772 (Nov. 1981).

Linn, J., IAB Privacy Task Force, Request for Comments No. 1113, "Privacy Enhancement for Internet Electronic Mail: Part I—Message Encipherment and Authentication Procedures" 1–30 (Aug. 1989).

Kent, S., et al., IAB Privacy Task Force, Request for Comments No. 114, "Privacy Enhancement for Internet Electronic Mail: Part II—Certificate–Based Key Management", 1–22 (Aug. 1989).

"Public Key Infrastructure Study—Final Report", *National Institute of Standards and Technology* (Apr. 1994).

International Standard ISO/IEC 9594–8, "Information technology—Open Systems Interconnection—The Directory: Authentication framework", *ISO/IEC*, second edition, Sep. 15, 1995.

Rivest, R. L., et al., "PayWord and MicroMint: Two simple micropayment schemes", *MIT Laboratory for Computer Science/Weizmann Institute of Science*, 11 pgs. (Nov. 1995).

Housley, R., et al. "Internet Public Key Infrastructure Part I: X.509 Certificate and CRL Profile", Published on the World Wide Web, 1–30 (Jun. 1996).

Farrell, S., et al. "Internet Public Key Infrastructure Part III: Certificate Management Protocols", Published on the World Wide Web, 1–36 (Jun. 1996).

TREE-BASED CERTIFICATE REVOCATION SYSTEM

This application is based on U.S. provisional patent application Ser. No. 60/006,143 filed on Nov. 2, 1995.

TECHNICAL FIELD

The present invention relates generally to secure communications and more particularly to schemes for certificate management.

BACKGROUND OF THE INVENTION

In many settings, it is useful to certify data, as well as to revoke data that was previously certified. For instance, in a Public Key Infrastructure (PKI), it may be useful to certify users' public keys. Such certification may be provided in the form of a certificate which contains the certified data and vouches authenticity of the certified data.

In a digital signature scheme, each user U chooses a signing key $SK_u$ and a matching verification key, $PK_u$. User U uses $SK_u$ to compute a digital signature of a message m, $SIG_u(m)$, while anyone knowing that $PK_u$ is U's public key can verify that $SIG_u(m)$ is U's signature of m. Finding $SIG_u(m)$ without knowing $SK_u$ is practically impossible. On the other hand, knowledge of $PK_u$ does not give any practical advantage in computing $SK_u$. For this reason, it is in U's interest to keep $SK_u$ secret (so that only he can digitally sign for U) and to make $PK_u$ as public as possible (so that everyone dealing with U can verify U's digital signatures). At the same time, in a world with millions of users, it is essential in the smooth flow of business and communications to be certain that $PK_u$ really is the legitimate key of user U. To this end, users' public keys are often "certified" by a certificate that serves as proof that U is the legitimate owner of $PK_u$. At the same time it is also useful to be able to revoke some of the already-issued certificates when U is no longer the legitimate owner of $PK_u$ (for whatever reason) and/or when $SK_u$ has been compromised. Of course, the need for certification and certificate revocation extends beyond certifying public keys.

In many instances, certificates for users' public keys are produced and revoked by certifying authorities called CA's. A complete public key infrastructure may involved other authorities (e.g., PCAs) who may also provide similar services (e.g., they may certify the public keys of their CA's). The present discussion can be easily applied to such other authorities in a straight-forward manner.

A CA may be a trusted agent having an already certified (or universally known) public key. To certify that $PK_u$ is U's public key, a CA typically digitally signs $PK_u$ together with (e.g., concatenating it with) U's name, a certificate serial number, the current date (i.e., the certification or issue date), and an expiration date. The CA's signature of $PK_u$ is then inserted in a Directory and/or given to U himself. Note that, before certifying U's public key, it is necessary to perform additional steps, such as properly identifying user U. However, these additional steps are optional.

Upon receiving the (alleged) digital signature of user U of a message M, $SIG_u(M)$, a recipient R needs to obtain a certificate for $PK_u$. (In fact, $SIG_u(M)$ may be a correct digital signature of M with respect to some public key $PK_u$, but R has no guarantee that $PK_u$ is indeed U's public key. Recipient R may obtain this certificate from the Directory, or from his own memory (if he has previously cached it), or from U himself. Having done this, R verifies (1) the correctness of the CA's certificate for $PK_u$ with respect to the CA's public key, and (2) the correctness of $SIG_u(M)$ with respect to $PK_u$. If the CA's public key is not universally known, or cached with R, then a certificate for the CA's key may also be obtained.

Certificate retrieval is thus possible, although not necessarily cheap.

Unfortunately, however, this is not the only retrieval that R needs to do. In addition, it is important that R makes sure that the certificate for $PK_u$ has not been revoked. This check, of course, may not be needed after the certificate's expiration date, but may be needed during the certificate's alleged lifetime. A user's certificate can be revoked for a variety of reasons, including key compromise and the fact that the user is no longer associated with a particular CA.

To enable a recipient to establish whether a given certificate has been revoked, it is known to have each CA periodically issues a Certificate Revocation List (CRL for short). A CRL may consist of the issuer's digital signature of a header comprising the issuer's name (as well as the type of his signature algorithm), the current date, the date of the last update, and the date of the next update, together with a complete list of revoked certificates (whose date has not yet expired), each with its serial number and revocation date. Since it is expected that a CA revokes many certificates, a CRL is expected to be quite long. It is envisaged that the CRL is provided to a directory who may then distribute the CRL to end users.

After performing some checks on the CA's CRL (e.g., checking the CA's digital signature, checking that the CRL has arrived at the expected time, that a certificate declared revoked in the previous CRL of that CA—and not yet expired still is revoked in the current CRL, etc.), the Directory stores it under its CA name.

When a user queries the Directory about the revocation of a certificate issued by a given CA, the Directory responds by sending to the user the latest CRL of that CA. The user can then check the CRL signature, the CRL dates (so as to receive a reasonable assurance that he is dealing with the latest one), and whether or not the certificate of interest to him belongs to it.

While CRLs are quite effective in helping users establishing which certificates are no longer deemed valid, they are also extremely expensive, because they tend to be very long and need to be transmitted very often.

The National Institute of Standard and Technology has tasked the MITRE Corporation to study the organization and cost of a Public Key Infrastructure (PKI) for the Federal Government. This study estimates that CRLs constitute by far the largest entry in the Federal PKI's cost list. According to MITRE's estimates/assumptions, in the Federal PKI there are about three million users, each CA serves 30,000 users, 10% of the certificates are revoked (5% because of key compromise and 5% because of change in affiliation with the organization connected to a given CA), CRLs are sent out bi-weekly, and the recipient of a digital signature requests certificate information 20% of the time (assuming that the remaining 80% of the time he will be dealing with public keys in his cache). The study envisages that each revoked certificate is specified in a CRL by means of about 9 bytes: 20 bits of serial number and 48 bits of revocation date. Thus, in the Federal PKI, each CRL is expected to comprise thousands of certificate serial numbers and their revocation dates; the header, however, has a fixed length, consisting of just 51 bytes.

At two cents per kilobyte, the impact of CRL transmission on the estimated yearly costs of running the Federal PKI is stunning: if each federal employee verifies one hundred digital signatures per day on average, then the total PKI yearly costs are $10,848 million of which 10,237 million is due to CRL transmission. If each employee is assumed to verify just five digital signatures a day on average, then the total PKI yearly costs are $732 million, of which 563 million is due to CRL transmission.

The MITRE study thus suggests that any effort should be made to find designs alternative to and cheaper than conventional CRL's.

In addition, we contend that it is possible for a user to query the Directory with a serial number not corresponding to any issued certificate. (Indeed, while many times the user has already seen a certificate and accesses the Directory just to confirm the current validity of that certificate, at other times the user wishes to obtain the corresponding certificate from the Directory). If the corresponding certificate does not exist, the Directory is at a loss as to how to proceed. If the Directory responds truthfully, it may not be believed by the user. If the Directory gives the users all the certificates in its possession (or those relative to a given CA) the user may suspect that the Directory left out the certificate of interest. Indeed, even if the Directory gives the user the latest CRL of a given CA, this does not prove to the user that the certificate in question does not exist. (In fact, the actions of the Directory may actually be interpreted as saying that the certificate is valid because it does not appear to have been revoked.) Thus in this thorny situation the Directory would have to be trusted.

BRIEF SUMMARY OF THE INVENTION

To avoid the dramatic CRL costs, a novel Certification Revocation System is described, where requesting users no longer receive the latest list of revoked certificates (of a given CA). The scheme utilizes a known tree-based authentication technique in a novel way to overcome the problems associated with the prior art.

It is thus a primary object of this invention to provide certificate management without providing CRL's to a user requesting information about the certificate (e.g., its validity). Although special CRL's still may be used between CA's and the Directory in this scheme, the tree-based technique allows the Directory to convince users of whether or not a given certificate is still valid in a way that is essentially individualized, and thus quite compact and convenient.

DETAILED DESCRIPTION OF THE PREFERRED EMBODIMENTS

Figure 1:
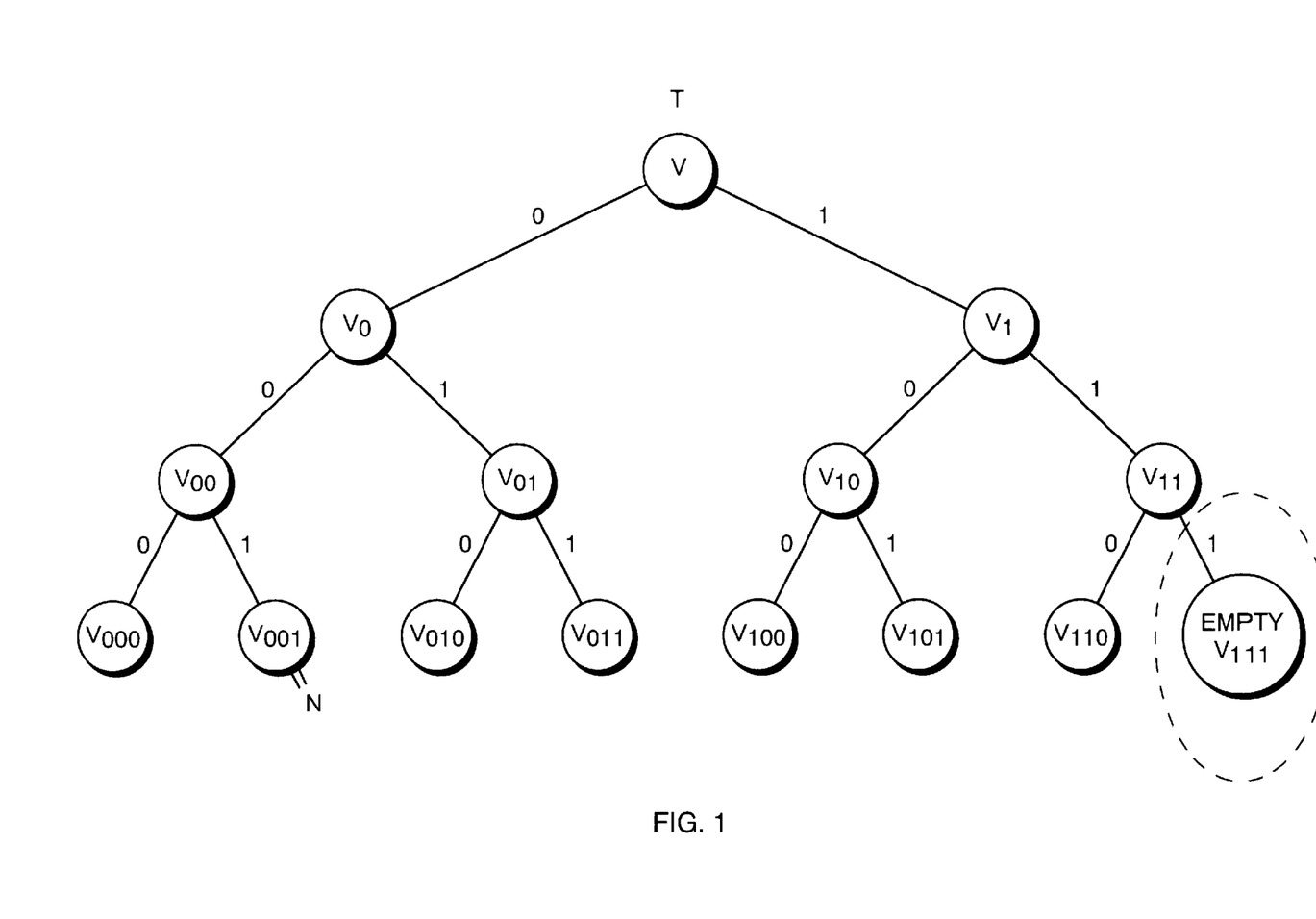
FIG. 1 shows a Merkle tree that is used in connection with the present invention.
Figure 2:
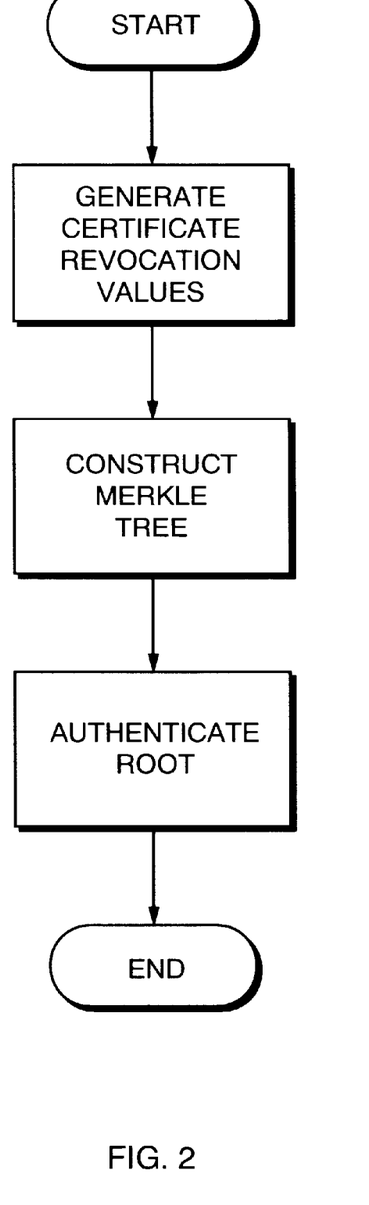
FIG. 2 shows how a specific Merkle tree is generated according to this invention.

An interesting authentication scheme is described in U.S. Pat. No. 4,309,569 to Merkle where it is used in connection with digital signatures. The FIG. 1 shows a simple Merkle tree, T. Merkle is hereby incorporated by reference and familiarity with the Merkle scheme is assumed in the following discussion. The Merkle scheme has been shown to be useful for applications other than digital signature schemes; in particular for constructing special and more efficient mathematical proof systems. The object of the present invention is to show how Merkle's scheme can yield certificate revocation systems more efficient than known CRL-based systems. FIG. 2 shows how a specific Merkle tree is generated according to this invention.

Briefly, a Merkle tree consists of a tree (binary, ternary, binary and ternary, etc.) with values corresponding to the tree nodes in the following manner. For simplicity, consider a full binary tree T with $n=2^k$ leaves and let H be a one-way hash function mapping strings of arbitrary length into B-bit strings (that is, a function H for which it is difficult to find two different strings x and y such that $H(x)=H(y)$). Then, T is a Merkle tree if the value corresponding to each internal node equals the one-way hash of the values corresponding to the children thereof. Developing a minimum of terminology, let N be an internal node where the left child is L and the right child is R, and let $V_L$ be the value corresponding to L and $V_R$ the value corresponding to R (we shall refer to $V_L$ and $V_R$ as, respectively, a left-value and a right-value). Then, for T to be a Merkle tree, the value corresponding to node N must be the B-bit value $H(V_L V_R)$, where $V_L V_R$ is the concatenation of $V_L$ and $V_R$ (although $V_L$ and $V_R$ may be combined by operations other than concatenation).

It is a well known property of a Merkle tree that (unless one "breaks" the one-way hash function—i.e., unless one is capable of finding two different strings x and y such that $H(x)=H(y)$—which would require an extraordinary amount of computation to do) changing the value of any node in a Merkle tree causes the root value to change also. It is also known that to verify whether the value of a given node N is authentic with respect to the root value of a Merkle tree, it suffices to use very few values of the tree. Indeed, it suffices to use the authentication path of node N, which is the sequence of values corresponding to the siblings of the nodes along the path from node N to the root. Each of the values of the nodes in the authentication path is an authentication value. If most of the internal nodes of a Merkle tree have two children, it is immediately seen that an authentication path comprises roughly k authentication values where k is the depth of the tree, even though the total number of nodes can be as much as $2^k$. (To facilitate the verification of the value corresponding to a node N whose position within the tree is unknown, the sequence of authentication values for N can be given by specifying whether each value is a left value or a right value. Vice versa, it is well known that if the authentication path of node N is verified as valid, the fact that each authentication value is a left or right value determines the position of node N within the tree.) Let us now recall, by way of example, how one can verify that the value of a node N is correct with respect to the value of the root. Referring to the sole figure, let N be the second leaf from the left in the tree T. Then, $V_{001}$ is the value of N; V is the value of the root; and the authentication path of N consists of the following sequence of three values: the left value $V_{000}$, the right value $V_{01}$, and the right value $V_1$. Then, because $V_{000}$ is a left value, one computes $H(V_{000}, V_{001})$ and calls $V_{00}$ the result. Then, because $V_{01}$ is a right value, one computes $H(V_{00}, V_{01})$ and calls the result $V_0$. Finally, because $V_1$ is a right value, one computes $H(V_0, V_1)$ and verifies that the result equals V, the root value.

Notice that a Merkle tree needs not to be a full binary tree. (For instance, if it is not, one can add dummy nodes to make it a full binary tree. Alternatively, instead of creating artificial nodes, it is possible to deem the value corresponding to any missing node a special, predetermined value, denoted by EMPTY in the sole figure.) Of course, if the tree is not sufficiently full, then authentication paths may become needlessly long.

One way to store certificate information in a Merkle tree includes associating pieces of the certificate information to leaves of the Merkle tree. For instance, the pieces of information are the values corresponding to the leaf nodes, while the one-way hash function determines the values of internal nodes of the tree, including the root. (As discussed elsewhere herein, however, it is possible to make certificate information correspond to internal nodes, including the root.)

Each node of the Merkle tree that corresponds to a portion of the certificate information is deemed a "certificate node". A simple way to associate certificate information to certificate nodes includes having as many certificate nodes as there are certificates, and making information about an individual certificate be the value corresponding to an individual certificate node.

Instead of having the CA provide information directly to users, in a preferred embodiment, one or more intermediaries interact with most of the users. The one or more intermediaries obtain the certificate information from the CA. (Whithin an authenticated tree, we refer to a value belonging to the authentication path as authenticating value.) The CA may provide an intermediary with an entire authenticated tree indicating which certificates have been revoked. As illustrated below, an authenticated tree is a Merkle tree (storing certificate information) having a root value that is authenticated (e.g., digitally signed) by the CA. To prove to an end user that a given certificate is revoked, the intermediary provides the user with (a) the value of certificate node N of the authenticated tree, where N is the certificate node whose value indicates that the certificate in question has been revoked; (b) the authentication path of node N in the tree; and (c) the digital signature of the CA of the root value of the tree. (Recall that this signature may include date information and additional information).

The end user, upon receiving (a), (b), and (c) from the intermediary, verifies that the digital signature of the CA is valid, thus learning the true root value of the tree. Then, the user also verifies that the authentication path for node N is valid with respect to the root value, thus learning the true information about the certificate in question. (Here by "true" we mean deemed true by the CA.) The user also verifies that the date information, if any, of the CA's signature of the root value is the expected date. (For instance, if the CA includes in the date information not only the date in which the authenticated tree was constructed, but also the date by which the CA intends to update the authenticated tree, the user also verifies that he is dealing with the latest authenticated tree.)

Notice that if the user trusts the CA, the user needs not trust the intermediary. Indeed, if the intermediary wishes to provide the user with false information about the certificate in question, the intermediary needs to perform an extraordinary amount of computation. For instance, if the intermediary wishes to modify the value corresponding to node N, the intermediary would have to either change the root value and therefore be able to forge the digital signature of the CA, or be able to break the one-way hash function.

Notice that the amount of data that an honest intermediary provides to a user in order to allow the user to verify that the revocation information about a given certificate is authentic is not very large, especially when compared to a conventional CRL. Indeed, the bulk of the data provided to the user consists of the authentication path of the node N. For instance, if there are 3,000 revoked certificates in the tree, then certificate information about these 3,000 certificates could be associated to the leaves of a Merkle tree of depth 12. Thus, there are at most 12 values in the authentication path of node N. If each value is 200 bits long (which is more than currently advocated for one-way hash functions), the total length of the authentication path is about 2400 bits. (more precisely, it is 11 times 200 bits for the values of internal nodes plus the length of the value of a leaf node. In fact, the authentication path of a certification leaf consists of one leaf value and eleven internal node values. As we shall see herein, however, even the length of leaf values can be made to be relatively small for authentication purposes.) This is much shorter than a CRL comprising the serial numbers and revocation dates of 3,000 revoked certificates. Of course, the new system also includes a digital signature of the root and date information, but so does the CRL system. Therefore, we succeed in a much more efficient way than a CRL system in having authentic information about certificates be provided to the end user by an intermediary without having to trust the intermediary.

In the example given above, an authenticated tree is used by the CA to provide the intermediary with data enabling the intermediary to prove to end users that a given certificate of the CA has been revoked. The CA may also use authenticated trees so as to enable the intermediary to prove much more general certificate information. For instance, as we have said, it should be possible for an intermediary to prove to end users not only the certification status of issued certificates, but also that (alleged) certificates have never been issued by the CA. For instance, this could be done as follows: Assume that, like in the PKI envisaged in the MITRE study, a serial number consists of a twenty-bit string. Then, each possible serial number can be put in correspondence with a leaf of a full binary tree of the depth twenty. Then, for each serial number, X, the CA creates and X-value such as "certificate number X has not yet been issued", or "certificate number X (has been issued and) is currently valid", or "certificate number X has been revoked (on date dx and for reason rx)", whichever is the case. Each X value is then associated to a leaf of its own. Once more, in this example, certificate nodes are leaf nodes. Then the CA associates values to all other nodes of the binary tree of level twenty using a one-way hash function H so as to form a Merkle tree. Then, the CA digitally signs the root value, thus obtaining an authenticated tree. An intermediary can use such a tree to efficiently prove to any end user the certification status of any possible serial number for a certificate, and thus the status of any possible certificate.

Note that it is possible to use the position of a node in an authenticated tree to convey information. For instance, in the above example, the CA may place information about certificate number X in leaf X so as to avoid having to store the serial number in the leaf. (Indeed, a leaf of a binary tree of depth twenty can be associated to a unique twenty-bit string in a natural way. Consider the path from the root to the leaf. If the first node from the root is a left child, we write "0". If the next node is a right child, we write "1". Thus, upon reaching the leaf in question, we have written a twenty-bit string X that uniquely identifies the leaf.) Position information in the tree can be exploited using different ways of encoding positional information. For instance, if the serial numbers of certificates in the tree begin with number one, then certificate information for certificate serial number one can be placed in the first leaf (i.e., left most terminal leaf), certificate information about certificate serial number two can be placed in the second leaf, etc.

In addition, it is possible to put information about more than one certificate into a single node of the tree so that, for example, if information about two certificates were placed in each of the terminal leaf nodes, then information about certificate serial numbers one and two could be in the first terminal leaf node, information about certificate serial numbers three and four could be placed in the second terminal leaf node, etc.

An authority that issues and revokes certificates maps certificate information into values. This mapping may be as simple (e.g., the identity mapping) or complex as required by the nature of the certificate information. For example, if the certificate information consists simply of identifying whether a certificate is issued, revoked, or expired, then the mapping could be 00=issued, 01=revoked, (10=expired,) and 11=never issued. In this way, each possible value corresponds to different possible states for each certificate.

As can be seen in the above example, it is possible to store, in a certificate node, certificate information about more than one certificate. If the values for M certificates can be stored in each node, and there are $2^{20}$ possible certificates, then the Merkle tree may have $2^{20}/M$ leaf nodes. A proper encoding is used so that the value a certificate node can be understood without ambiguity. For instance, if we care about proving information of the type 00=issued, 01=revoked, 10=expired, and 11=never issued, and we want every value in the authenticated tree to be 200 bits long, then information for one hundred certificates may be stored in each certificate node. One knows a priori that two bits of certificate status about certificate number one through one hundred are to be found in the value of the first leaf. Further, one knows that the first two bits of that value correspond to certificate number one, that the second pair of bits in that value correspond to certificate number two, etc.

As discussed above, it is not necessary for the users to trust the intermediary since the intermediary provides certificate information to the users in a way that indicates that the CA has authenticated the certificate information. Note that an intermediary includes, but is not limited to, a directory, a distributor, a redistributor, a user, a CA, a database, a readable computer file, a read-only computer file, an entity that has obtained information from another intermediary, or any combination of the above. Generally, an intermediary is an entity that provides certificate information authenticated by a CA.

A major advantage of conveying certificate information via authenticated trees consists of efficient updating. For instance, in a typical day, a CA may issue ten more certificates and revoke one previously issued certificate. In such a case, the CA may provide the intermediary with a new authenticated tree that contains the current certificate information about all certificates. More efficiently, however, the CA may provide the intermediary just with the new values of the certificate nodes, whose values have changed, together with the digital signature of the new root (and proper date information). In sum, therefore, the CA sends very little information to the intermediary. (Of course, if so wanted, teh CA can send additional information. For instance, he may send not just the certified nodes that have changed, but values of nodes that have changed and the position of these nodes. So doing, he may simplify the work of teh intermediary.)

The intermediary could use the new received values and the old values and the one-way hash function to compute the new Merkle tree, and thus, in particular, the new root value so that the intermediary can check the digital signature of the CA and verify the new authenticated tree. The intermediary is now ready to provide a user with updated certificate information.

The same efficiency can be obtained when the intermediary wishes to provide end users proofs of certificate information. For instance, a given user U may already be in possession of yesterday's entire authenticated tree. In this case, the intermediary can bring the user up to date by providing the user with just the values that have changed and the signature of the CA of the new root value. Of course, the user may not have yesterday's full authenticated tree, but he may have the full authenticated tree of, say, two weeks earlier. In this case, the intermediary may still provide the user with just the values that have changed with respect to two weeks ago along with the CA's signature of the new root value. This may still result in substantial savings.

The intermediary may know, by keeping track of what was sent to the user, which authenticated tree the user already knows. Alternatively, the user may signal to the intermediary which authenticated tree he already has and the intermediary may act accordingly. In general, the intermediary may omit sending to the user values that the user already knows. In addition, it is possible for the intermediary to obtain some of the authenticated tree information from an entity other than the CA, in which case the CA may only provide the intermediary with authenticated tree information that is not already known by the intermediary. Note that it is also possible for the intermediaries to obtain information about the tree from other sources, such as other intermediaries.

In another embodiment of the invention, the CA may make use of two or more Merkle trees to convey certificate information. For instance, a first tree may contain information about issued but non-revoked certificates, and a second tree may contain information about revoked certificates. The root values of these trees (together with other information deemed proper) may be digitally signed by the CA either separately or together, thus making these Merkle tree authenticated trees.

Alternatively, it is possible to have a first authenticated tree containing information about all issued certificates and a second authenticated tree containing information about all revoked certificates. This embodiment is similar to the two tree system described above where one authenticated tree contains information about issued but non-revoked certificates and the second authenticated tree contains information about revoked certificates. However, in the case, knowing the issued certificates and revoked certificates makes it possible to determine or ascertain if a certificate is valid (i.e., by determining if the certificate is both issued and not revoked). It is also possible to construct an authenticated tree containing information about certificates that have not been issued. In that case, the authority can provide an intermediary with information for proving that one or more certificate serial numbers (or other appropriate certificate identifiers) do not correspond to any certificate that was issued as of a given date. Other possible combinations of authenticated trees containing certificate information are possible, as will become apparent from the following discussion.

Note that an authenticated tree may be constructed by the CA or by another entity, such as the intermediary, and that the other entity may simply present the root of the underlying Merkle tree to the CA for authentication. Also, it is possible for the CA to authenticate nodes, other than or in addition to the root, of a Merkle tree. In the case of a node other than the root of a Merkle tree being authenticated by the CA, an authentication path can be verified with respect to such an authenticated node rather that with respect to the root. It should be noted, however, that by authenticating (e.g., digitally signing) one or more nodes of a Merkle tree, the CA is actually generating authenticated (sub)trees that are stand-alone authenticated trees in their own right.

Note that the certificate information CI corresponding to a certificate node N may be one-way hashed prior to being associated to the node. That is, the value associated to node N is H(CI) rather than CI. The process of passing from CI to H(CI) is a possible mapping step performed by a CA. One advantage of such a mapping is that if node N is, say, a leaf node, then whenever the value of N is used within an authentication path of another node, it only contributes some, say, 200 bits to such a path no matter how long CI may be. (Indeed, CI may be a very long string indicating, among other things, the reasons that a certificate has been revoked.) On the other hand, when we wish to provide CI in an authenticated manner, we reveal CI in full. (See, for example, Leighton et al.). Such a full value of CI is first mapped to H(CI) and then this mapped value is proved to be the value of a genuine certificate node in an authenticated tree.

Note also that the intermediary may not directly send data to an end user, but cause the end user to receive data (e.g., by someone else, possibly at a signal of an intermediary, or by enabling the user to read some data file, or in any other manner).

Note that the scheme disclosed herein can be expanded beyond the simple type of tree disclosed in Merkle. An example of such expansions are given in U.S. Pat. No. 5,432,852 to Leighton et al, which is incorporated by reference herein. In particular, although an authenticated tree may have an underlying structure of a tree such as that disclosed in Merkle, the authenticated tree may in fact may have other interconnections and paths therethrough. Similarly, it is possible to have the value of a node depend on the position, P, of the node within the tree. For example, in such a case, the value of the node may be H(VL, VR, P), where VL is the value of the node's left child and VR is the value of the node's right child. Including position information helps prevent attack by someone who attempts to find two values that hash to an actual node value of an authenticated tree. When the node information includes position information, then a prospective attacker would have to find values that hashed to the combination of the children information and the position information, which is much less likely. U.S. Pat. No. 5,432,852 to Leighton et al. discloses a similar idea used in connection with a signature scheme. Note also that the hashed value of a node could be a bash of the children concatenated with a position of the node within the tree or could be a hash of the concatenation of the children and the position.

In addition, one or more of the nodes containing the certificate information (i.e., the certificate nodes), are not all necessarily leaf nodes of the tree, but, instead, have children of their own. For instance, let N be an internal node whose left child has a value VL and whose right child has a value VR, and let CI be some certificate information that we wish to associate to node N. Then, the value associated with node N can be made equal to VN=H(VL,VR,CI).

It should be realized the system disclosed herein facilitates batch processing. For example, rather than signing n pieces of certificate information separately, a CA may "Merkle" hash the quantities so as to obtain a single root-value, and then digitally signs the root-value (together with additional quantities if desired). This is a way to substitute n individual signatures (that can be expensive to obtain) with just one signature and n−1 hashing (which are not expensive at all). Notice that any signature scheme can be used for the root, including pen-written signatures, rather than digital ones.

Notice that a one-way hash function needs not to map every string to values having always B bits. For instance, it may map soem strings to 160-bit values and some other strings to 200-bit values. Also notice that an authenticated tree needs not to be constructed by means of a single one-way hash function. For instance, a first one-way hash function could be used for nodes at the first level, a second one-way hash function for nodes at the second level, etc. More generally, one could use a different one-way hash function for each position within the tree. Notice, however, that such a collection of one-way hash functions is a single one-way hash function for purposes of constructing an authenticated tree.

The foregoing has outlined some of the more pertinent objects and details of a preferred embodiment of the present invention. These objects and details should be construed to be merely illustrative of some of the more prominent features and applications of the invention. Many other beneficial results can be attained by applying the disclosed invention in a different manner or modifying the invention as will be described. Those skilled in the art will recognize that the invention can be practiced, with modification, in other and different certification methods and schemes within the spirit and scope of the invention. Also, note that the need for certification and certificate revocation extends beyond certifying public keys and could include certifying any information.

One of the preferred implementations of the various routines disclosed above is as a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

What is claimed is:

1. A method for using at least one Merkle tree for authenticating revocation status about a plurality or certificates issued by a certifying authority, comprising the steps of:

(a) generating a plurality of values indicating that a plurality of certificates have been revoked, wherein for each certificate, there is at least one value indicating status of the certificate;

(b) an entity other than the certification authority constructing at least one Merkle tree containing on a plurality of its nodes its plurality of values indicating the certificates that have been revoked; and (c) authenticating, with a digital signature, a root node of the at least one Merkle tree to provide an authenticated root.

2. A method according to claim 1, wherein the digital signature is verified by an end user.

3. A method according to claim 1, wherein the values indicate which certificates have been revoked.

4. A method according to claim 1, wherein the values indicate which certificates are valid.

5. A method according to claim 1, wherein the values indicate which certificates have been revoked and which certificates are valid.

6. A method according to claim 1, wherein at least one node of the Merkle tree corresponds to more than one certificate.

7. A method according to claim 1, wherein the values correspond to serial numbers of the certificates.

8. A method according to claim 7, wherein the values correspond to serial numbers of the certificates combined with additional information.

9. A method according to claim 1, wherein the root is authenticated with date information.

10. A method according to claim 1, wherein the values are stored in leaf nodes of the at least one tree.

11. A method according to claim 1, wherein an intermediary causes authenticating values of at least one of the values to be provided to an end user.

12. A method according to claim 1, wherein the values include serial numbers of the certificates.

13. A method according to claim 1, wherein an intermediary constructs the tree.

14. A method according to claim 1, wherein an authority constructs the tree.

15. A method according to claim 1, wherein a single tree is used.

16. A method according to claim 15, wherein an intermediary constructs the tree.

17. A method according to claim 15, wherein an authority constructs the tree.

18. A method according to claim 1, wherein more than one tree is used.

19. A method according to claim 18, wherein an intermediary constructs the tree.

20. A method according to claim 18, wherein an authority constructs the tree.

21. A method for using at least one Merkle tree for authenticating revocation status about a plurality of certificates, comprising:

(a) generating a plurality of values indicating that a plurality of certificates have been revoked, wherein for each certificate, there is at least one value indicating status of the certificate;

(b) constructing at least one Merkle tree containing on a plurality of its nodes the plurality of values indicating the certificates that have been revoked; and (c) authenticating, with a digital signature, a root node of the at least one Merkle tree to provide an authenticated root.

22. A method according to claim 21, wherein the digital signature is verifiable by an end user.

23. A method according to claim 21, wherein the values indicate which certificates have been revoked.

24. A method according to claim 23, wherein the values include a date of revocation for the certificates that have been revoked.

25. A method according to claim 21, wherein the values indicate which certificates are valid.

26. A method according to claim 25, wherein the values include a date of expiration for the certificates that are valid.

27. A method according to claim 21, wherein the values indicate which certificates have been issued.

28. A method according to claim 21, wherein the values indicate which certificates have been revoked and which certificates are valid.

29. A method according to claim 21, wherein the values indicate which certificates have been revoked and which certificates have been issued.

30. A method according to claim 21, wherein the values indicate which certificates are valid and which certificates have been issued.

31. A method according to claim 21, wherein the values indicate which certificates have been revoked, which certificates are valid, and which certificates have been issued.

32. A method according to claim 31, wherein some of the values also indicate a position within the tree.

33. A method according to claim 21, wherein at least one of the values corresponds to more than one certificate.

34. A method according to claim 33, wherein the values include a date of issue for the certificates that have been issued.

35. A method according to claim 21, wherein certificate information determines locations of the values within the Merkle tree.

36. A method according to claim 21, wherein positions of the values within the Merkle tree provide information about certificates corresponding thereto.

37. A method according to claim 36, wherein the information includes serial numbers for each of the certificates.

38. A method according to claim 21, wherein the values correspond to serial numbers of the certificates.

39. A method according to claim 38, wherein the certificate values correspond to serial numbers of the certificates combined with additional information.

40. A method according to claim 21, wherein the authenticated root contains additional information.

41. A method according to claim 40, wherein the additional information includes date information.

42. A method according to claim 40, wherein the additional information includes an indication of at least one of: revoked, issued, and valid for describing certificate information corresponding to the values of the Merkle tree.

43. A method according to claim 21, wherein the values indicating status of certificates are leaf nodes of the Merkle tree.

44. A method according to claim 21, wherein location of the values within the Merkle tree varies according to the values.

* * * * *

UNITED STATES PATENT AND TRADEMARK OFFICE
CERTIFICATE OF CORRECTION

PATENT NO. : 6,097,811
DATED : August 1, 2000
INVENTOR(S) : Silvio Micali

It is certified that error appears in the above-indentified patent and that said Letters Patent is hereby corrected as shown below:

Column 1, line 44, change "involved" to --involve--.
Column 1, line 61, delete "(" (first occurrence).
Column 2, line 17, change "issues" to --issue--.
Column 2, line 32, after "expired" insert ------ (hyphen).
Column 4, line 46, after ")" begin new paragraph.
Column 5, line 19, change "Whithin" to --Within--.
Column 6, line 4, change "(more" to --(More--.
Column 7, line 54, change "teh" to --the--.
Column 7, line 58, change "teh" to --the--.
Column 8, line 41, change "the" to --this--.
Column 8, line 63, change "that" to --than--.
Column 9, line 28, delete "may" (second occurrence).
Column 9, line 43, change "bash" to --hash--.
Column 10, line 1, change "soem" to --some--.
Column 10, line 42, change "or" to --of--.
Column 10, line 43, change "thc" to --the--.
Column 10, line 51, change "its" to --the--.

Signed and Sealed this

Tenth Day of April, 2001

Attest:

NICHOLAS P. GODICI

*Attesting Officer*   *Acting Director of the United States Patent and Trademark Office*